No. 607,330. Patented July 12, 1898.
J. F. BENGERT.
BICYCLE STAND.
(Application filed Mar. 26, 1897.)

(No Model.) 2 Sheets—Sheet 1.

WITNESSES:
Edward Thorpe
J. F. de Acker

INVENTOR
J. F. Bengert
BY
ATTORNEYS.

THE NORRIS PETERS CO., PHOTO-LITHO., WASHINGTON, D. C.

No. 607,330. Patented July 12, 1898.
J. F. BENGERT.
BICYCLE STAND.
(Application filed Mar. 26, 1897.)

(No Model.) 2 Sheets—Sheet 2.

WITNESSES:
Edward Thorpe
J. Fred Acker

INVENTOR
J. F. Bengert
BY
ATTORNEYS.

THE NORRIS PETERS CO., PHOTO-LITHO., WASHINGTON, D. C.

UNITED STATES PATENT OFFICE.

JOHN F. BENGERT, OF BROOKLYN, NEW YORK.

BICYCLE-STAND.

SPECIFICATION forming part of Letters Patent No. 607,330, dated July 12, 1898.

Application filed March 26, 1897. Serial No. 629,362. (No model.)

*To all whom it may concern:*

Be it known that I, JOHN F. BENGERT, of Brooklyn, in the county of Kings and State of New York, have invented a new and useful Improvement in Bicycle-Stands, of which the following is a full, clear, and exact description.

The object of my invention is to provide a stand for bicycles equally adapted to a diamond frame or to a drop frame, which stand may be a permanent attachment to the frame and carried by said frame without in the least interfering with the action of the wheels.

A further object of the invention is to provide a stand for a bicycle of simple, durable, and economic construction, whereby the stand may be brought in instant operation to hold the bicycle in an upright position on the road or other surface, and whereby, further, the stand may also be employed for holding the bicycle at an elevation above the floor when the bicycle is placed in storage.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
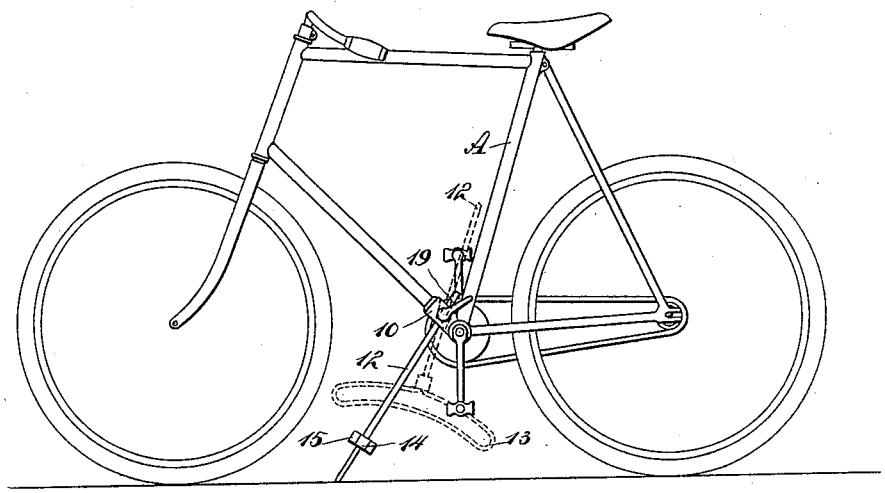
Figure 2:
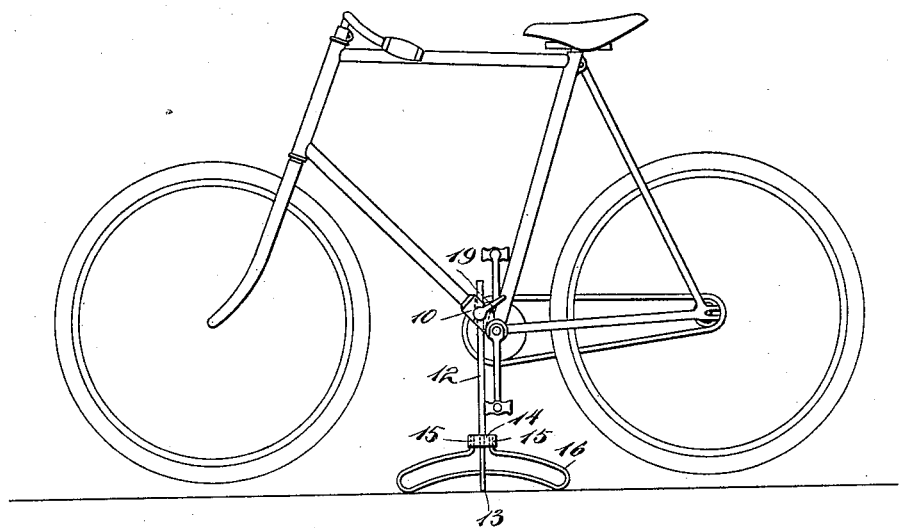
Figure 3:
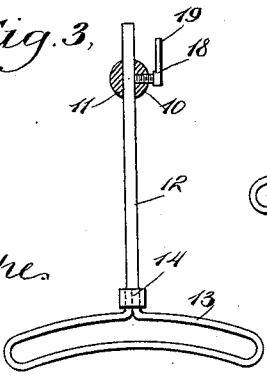
Figure 4:
Figure 5:
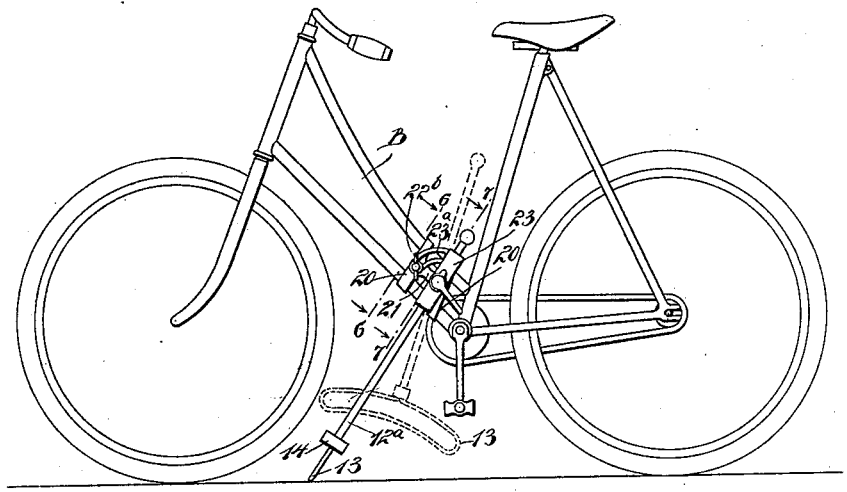
Figure 6:
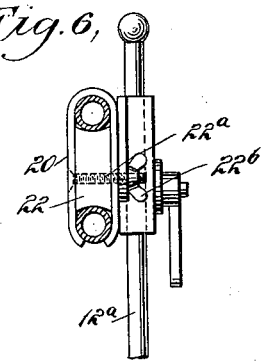
Figure 7:
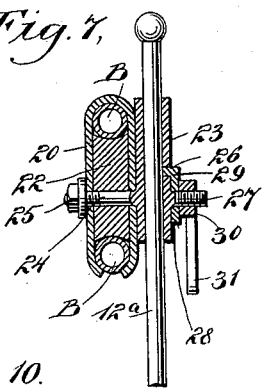
Figure 8:
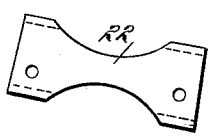
Figure 10:
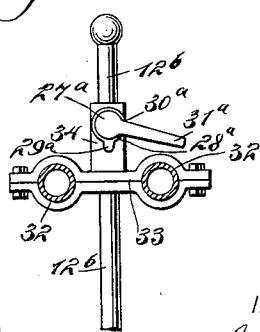
Figure 9:

Figure 1 is a side elevation of a bicycle having a diamond frame and a side elevation of the attachment applied to the frame, in positive lines showing the attachment in its lower position supporting the frame and wheels and in dotted lines in an elevated position clear of the ground. Fig. 2 is a side elevation of a diamond-frame bicycle, illustrating the bicycle as held by the stand, which is shown likewise in side elevation free from the ground or floor. Fig. 3 is a section through the frame at a point where the attachment is applied, the attachment being shown in full side elevation. Fig. 4 is a side elevation of the auxiliary foot for the attachment. Fig. 5 is a side elevation of a bicycle having a drop frame, illustrating the improvement applied thereto. Fig. 6 is a section on the line 6 6 of Fig. 5. Fig. 7 is a section on the line 7 7 of Fig. 5. Fig. 8 is a detail view of a strengthening-block used in connection with the form of device illustrated in Fig. 5. Fig. 9 is a perspective view of a locking-washer used in connection with the form of device shown in Fig. 5; and Fig. 10 is a vertical section through the frame of a tandem, illustrating the application of the improvement thereto.

When a diamond frame is employed, a sleeve or a block 10 is located between the crank-hanger and the lower or main brace of the diamond frame A, as illustrated in Figs. 1 and 2. The said sleeve or block has an elongated opening 11 made therein, (shown in dotted lines in Fig. 1,) which will admit of a standard 12 being passed through the opening in the block or sleeve and given an inclination with respect to the perpendicular of the frame or given a position parallel with a perpendicular line drawn through the frame.

At the lower end of the standard 12 a foot 13 is secured. Above the foot a collar 14 is attached to the standard, having openings 15 near each end. In connection with the standard 12 and the attached foot 13 an auxiliary foot 16 is employed, (shown in Fig. 4,) having outwardly-extending lugs 17, arranged to enter the openings 15 in the collar 14. The auxiliary foot when employed stands substantially at a right angle to the main foot 13 or that which is permanently connected with the standard 12. The standard 12 is intended to be a fixture on the frame, and when the bicycle is in use on the road said standard 12 is carried upward to the position shown in dotted lines in Fig. 1, which will bring the attached foot 13 such a distance above the ground as not to interfere with the progress of the bicycle even when it may meet obstructions or obstacles.

The standard 12 is held in the position to which it is adjusted by means of a set-screw 18, passed through the sleeve or block 10 to an engagement with the standard, which set-screw may be operated by a handle 19 in crank form or through the medium of a thumb-nut secured to the screw or the equivalents of the same. When the bicycle is to be placed in storage, the standard 12 is carried to the vertical position shown in Fig. 2 and the auxiliary foot 16 is added, the frame of the bicycle being raised on the standard until the wheels are clear of the floor or the ground, whereupon the frame may be locked to the standard through the medium of the set-screw.

In Fig. 5 I have illustrated the application of the device to a drop frame B, in which two lower or main braces are employed, located one above the other. In this style of frame the attachment consists of straps 20, passed over the lower or main braces, one near the center brace and the other at a point in front of it, the two straps being connected, preferably, by bars 21 at each side. In order to strengthen these straps, a block 22 is placed between the two main braces of the frame and made to enter each strap, being attached to the forward strap through the medium of a screw 22$^a$, preferably provided with a thumb-nut 22$^b$, as shown in Fig. 6. At one side of the rear strap 20 a sleeve or socket 23 is located, which sleeve or socket is provided with a spindle 24, which passes through the rear strap and through the rear end of the connecting or strengthening block 22, as illustrated in Fig. 7, having a suitable lock-nut 25 at its outer end. In this manner the sleeve 23 may be rocked upon the strap attachment to the frame. An opening 26 is made in the outer side of the sleeve 23, as is also shown in Fig. 7, and below said opening 26 a threaded pin 27 is outwardly projected from the sleeve. A washer 28 is fitted over the threaded pin, which washer has a projection carrying a pin 29, adapted to enter the opening 26 in the sleeve 23, the washer being shown in detail in Fig. 9. A nut 30 is screwed on the threaded pin to an engagement with the washer, being manipulated through the medium of a crank-handle 31 or the equivalent of the same. Thus it will be observed that the standard 12$^a$, passed through the sleeve, will be engaged by the pin 29, the standard being provided with a single foot, or the two forms of feet, as heretofore described, and therefore the standard 12$^a$ may be placed at an inclination, as shown in positive lines in Fig. 5, to hold the drop frame in an upright position when the rider has dismounted, or the standard 12$^a$ may be placed in a perpendicular position to support the frame so that its wheels will clear the ground or floor.

In Fig. 10 I have shown the application of the device to the frame of a tandem, in which the lateral parallel lower main braces 32 are shown in section, being connected by clamps 33, from which clamps a sleeve or a collar 34 is upwardly projected, which adjustably receives a standard 12$^b$, carrying a single foot or two feet, as found desirable. The locking device for the standard shown in Fig. 10 is the same as the locking device shown in Fig. 7, a washer 28$^a$ being mounted upon a threaded stud 27$^a$, projected from the sleeve, the threaded stud or pin carrying a nut 30$^a$, operated through the medium of a handle 31$^a$ or its equivalent, the washer 28$^a$ having a pin 29$^a$, corresponding to the pin 29 shown in Fig. 9, which extends through the sleeve or collar 34 to an engagement with the standard 12$^b$.

It is obvious that a device of this description is exceedingly simple, durable, and economic. Furthermore, as an additional lock for the standard in the drop-frame form a slotted sector 23$^a$ is projected forwardly and downwardly from the sleeve 23, the forward screw 22$^a$ being passed through the slot of the sector, which sector is engaged by the thumb-nut 22$^b$.

Having thus described my invention, I claim as new and desire to secure by Letters Patent—

1. A stand for bicycle-frames, consisting of an upright, a foot connected with the upright, a socket formed upon the upright above the foot, having receiving-compartments at each side of the foot, and an auxiliary foot having projections arranged to enter the aforesaid receiving-compartments of the socket, as and for the purpose set forth.

2. A support for bicycles, consisting of a bracket attachment for a frame, a sleeve or socket held to rock upon said bracket attachment, a standard having end movement in said sleeve or socket and provided with a foot, a projection from the sleeve or socket, a washer located on said projection and arranged to enter an opening in the sleeve or socket and engage with the standard, and a locking device for said washer, as and for the purpose specified.

3. A support for bicycles, consisting of a bracket attachment for the frame, a sleeve held to rock upon said bracket attachment, a standard having end movement in said sleeve and provided with a foot, a projection from the sleeve, a washer located on said projection and arranged to enter an opening in the sleeve and engage with the standard, a locking device for said washer, and an auxiliary locking device for the sleeve connected with said bracket attachment, as and for the purpose specified.

4. The combination, with a bicycle-frame, a bracket secured thereto, and a sleeve having rocking movement on said bracket, being provided with a threaded pin and an opening above the pin, of a standard having end movement in the sleeve, a washer loosely mounted on the threaded pin, having a projection arranged to enter said opening in the sleeve, and a nut screwed upon the pin to an engagement with said washer, as and for the purpose specified.

JOHN F. BENGERT.

Witnesses:
J. FRED. ACKER,
A. A. HOPKINS.